United States Patent
Douglas et al.

(10) Patent No.: US 7,278,047 B2
(45) Date of Patent: Oct. 2, 2007

(54) PROVIDING DIFFERENT CLOCK FREQUENCIES FOR DIFFERENT INTERFACES OF A DEVICE

(75) Inventors: John W. Douglas, Lexington, KY (US); Darrel L. Henry, Versailles, KY (US); Samuel W. Gardiner, Lexington, KY (US); Jimmy D. Moore, Jr., Lexington, KY (US); Duane E. Norris, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1124 days.

(21) Appl. No.: 10/269,726

(22) Filed: Oct. 14, 2002

(65) Prior Publication Data

US 2004/0071159 A1 Apr. 15, 2004

(51) Int. Cl.
*G06F 1/04* (2006.01)
*G06F 1/12* (2006.01)
*G06F 5/06* (2006.01)

(52) U.S. Cl. ............... 713/600; 713/500; 713/501; 713/502; 713/503; 713/601

(58) Field of Classification Search ......... 713/500–601
See application file for complete search history.

(56) References Cited

U.S. PATENT DOCUMENTS

| | | | | |
|---|---|---|---|---|
| 4,893,271 A | * | 1/1990 | Davis et al. ............... 713/501 |
| 5,680,594 A | * | 10/1997 | Charneski et al. ......... 713/501 |
| 5,754,607 A | * | 5/1998 | Powell et al. .............. 375/373 |
| 5,778,237 A | * | 7/1998 | Yamamoto et al. ......... 713/322 |
| 5,954,800 A | * | 9/1999 | Jung et al. ................. 709/250 |
| 6,185,641 B1 | | 2/2001 | Dunnihoo |
| 6,211,740 B1 | * | 4/2001 | Dai et al. ..................... 331/2 |
| 6,218,969 B1 | | 4/2001 | Watson et al. |
| 6,266,731 B1 | | 7/2001 | Riley et al. |
| 6,314,522 B1 | | 11/2001 | Chu et al. |
| 6,334,160 B1 | | 12/2001 | Emmert et al. |
| 6,370,603 B1 | * | 4/2002 | Silverman et al. ............ 710/72 |
| 6,456,702 B2 | * | 9/2002 | Nishihara ................ 379/93.05 |
| 6,529,083 B2 | * | 3/2003 | Fujita ........................ 331/49 |
| 6,643,499 B1 | * | 11/2003 | Audinot et al. ............. 455/260 |
| 6,665,810 B1 | * | 12/2003 | Sakai ........................ 713/600 |
| 6,724,850 B1 | * | 4/2004 | Hartwell .................... 375/376 |
| 6,779,125 B1 | * | 8/2004 | Haban ....................... 713/500 |
| 7,006,258 B2 | * | 2/2006 | Hikichi ..................... 358/3.28 |
| 7,062,664 B2 | * | 6/2006 | Date et al. ................. 713/320 |
| 7,237,053 B1 | * | 6/2007 | Mitsuhashi et al. ......... 710/302 |

(Continued)

*Primary Examiner*—Rehana Perveen
*Assistant Examiner*—James F Sugent
(74) *Attorney, Agent, or Firm*—Thompson Hine LLP

(57) ABSTRACT

A method for operating a device (such as a printer) having a first interface (such as USB interface) connectable to a first computer and a second interface (such as an Ethernet interface) connectable to a second computer. A phase lock loop (PLL) circuit is obtained which is driven by a clock source, which is adapted for switching between operating at the first and second clock frequencies, and which is operatively connected to the first and second interfaces to provide a clock signal to the first and second interfaces. The PLL circuit is operated at the first clock frequency when the first interface is active and is operated at the second clock frequency when the second interface is active. A device includes the first and second interfaces, the PLL circuit, and the clock source.

19 Claims, 3 Drawing Sheets

U.S. PATENT DOCUMENTS

2002/0007431 A1  1/2002  Date et al.
2002/0019898 A1*  2/2002  Hayashi et al. ............. 710/110
2002/0038334 A1  3/2002  Schneider et al.
2002/0039197 A1  4/2002  Hikichi
2002/0062457 A1*  5/2002  Kamihara ................... 713/600
2002/0095558 A1*  7/2002  Shiosaki ..................... 711/167

* cited by examiner

PROVIDING DIFFERENT CLOCK FREQUENCIES FOR DIFFERENT INTERFACES OF A DEVICE

TECHNICAL FIELD

The present invention relates generally to a device having an interface for connecting to a computer, and more particularly to providing different clock frequencies for different interfaces of the device.

BACKGROUND OF THE INVENTION

Devices, such as printers, which connect to a computer are well known. A computer has many different known ways (or interfaces) for the device to connect to it. Two such interfaces are the Universal Serial Bus (USB) interface and the Ethernet interface. The USB interface provides a way for the device to directly connect to one computer. The Ethernet interface is a network interface which provides a way for the device to connect to any computer on the network. Known devices, such as some printers, include those having both USB and Ethernet interfaces. The USB and Ethernet interfaces operate at different speeds and require different clock speeds. The USB interface requires a 48 megahertz (MHz) clock to operate. The Ethernet interface physical layer (PHY) that controls the signaling rate on the network requires a 25 MHz clock frequency to operate.

One known method to provide the different clock frequencies to the USB and Ethernet interfaces of the same device is to provide two clock sources such as two resonators or crystals. In this method, a 48 (or 24 which is later doubled) MHz crystal or resonator is used to drive the USB interface, and a 25 MHz crystal or resonator is used to drive the logic of the PHY of the Ethernet interface. The USB interface logic is usually implemented in a digital application specific integrated circuit (ASIC). This method requires two relatively expensive crystals or resonators on the printed circuit board (PCB) of the device.

Another known method to provide the different clock frequencies to the USB and Ethernet interfaces of the same device is to use one clock source to drive two separate phase lock loop circuits in a digital ASIC. The first phase lock loop circuit is dedicated to the 48 MHz clock frequency for the USB interface, and the second phase lock loop circuit is dedicated to the 25 MHz clock frequency for the PHY of the Ethernet interface. Because a phase lock loop circuit is an analog structure, it takes up a significant portion of the digital ASIC die size requiring a larger die size which increases costs.

What is needed is an improved method for providing different clock frequencies for different interfaces of a device.

SUMMARY OF THE INVENTION

A first method of the invention is for operating a printer having a Universal Serial Bus (USB) interface connectable to a first computer and having an Ethernet interface connectable to a second computer. The USB interface operates at a USB clock frequency, and the Ethernet interface operates at a different Ethernet clock frequency. The printer communicates over only one of the USB and Ethernet interfaces at the same time. The first method includes steps a) through h). Step a) includes obtaining a clock source having a set base frequency. Step b) includes obtaining a phase lock loop circuit adapted for switching between operating at the USB and Ethernet clock frequencies when driven by the clock source. Step c) includes driving the phase lock loop circuit with the clock source. Step d) includes operatively connecting the phase lock loop circuit to the USB and Ethernet interfaces to provide a clock signal to the USB and Ethernet interfaces. Step e) includes operating the phase lock loop circuit at the USB clock frequency when the USB interface is active. Step f) includes operating the phase lock loop circuit at the Ethernet clock frequency when the Ethernet interface is active. Step g) includes determining that the USB interface is active when power (VBUS) supplied over the USB interface by the first computer to the printer is present and when a link between the second computer and the printer is not established on the Ethernet interface physical layer (PHY) that controls the signaling rate on the network. Step h) includes determining that the Ethernet interface is active when a link is established between the second computer and the printer on the Ethernet interface PHY before VBUS is present.

A second method of the invention is for operating a device having a Universal Serial Bus (USB) interface connectable to a first computer and having an Ethernet interface connectable to a second computer. The USB interface operates at a USB clock frequency, and the Ethernet interface operates at a different Ethernet clock frequency. The device communicates over only one of the USB and Ethernet interfaces at the same time. The second method includes steps a) through f). Step a) includes obtaining a clock source having a set base frequency. Step b) includes obtaining a phase lock loop circuit adapted for switching between operating at the USB and Ethernet clock frequencies when driven by the clock source. Step c) includes driving the phase lock loop circuit with the clock source. Step d) includes operatively connecting the phase lock loop circuit to the USB and Ethernet interfaces to provide a clock signal to the USB and Ethernet interfaces. Step e) includes operating the phase lock loop circuit at the USB clock frequency when the USB interface is active. Step f) includes operating the phase lock loop circuit at the Ethernet clock frequency when the Ethernet interface is active.

A third method of the invention is for operating a device having a first interface connectable to a first computer and having a second interface connectable to a second computer. The first interface operates at a first clock frequency, and the second interface operates at a different second clock frequency. The device communicates over only one of the first and second interfaces at the same time. The third method includes steps a) through f). Step a) includes obtaining a clock source having a set base frequency. Step b) includes obtaining a phase lock loop circuit adapted for switching between operating at the first and second clock frequencies when driven by the clock source. Step c) includes driving the phase lock loop circuit with the clock source. Step d) includes operatively connecting the phase lock loop circuit to the first and second interfaces to provide a clock signal to the first and second interfaces. Step e) includes operating the phase lock loop circuit at the first clock frequency when the first interface is active. Step f) includes operating the phase lock loop circuit at the second clock frequency when the second interface is active.

An embodiment of the invention is for a device including a first interface which is connectable to a first computer and which operates at a first clock frequency and including a second interface which is connectable to a second computer and which operates at a different second clock frequency. The device also includes a clock source and a phase lock loop circuit which is driven by the clock source, which is adapted for switching between operating at the first and second clock frequencies, and which is operatively connected to the first and second interfaces to provide a clock signal to the first and second interfaces.

Several benefits and advantages are derived from one or more of the methods and the embodiment of the invention. Using a single phase lock loop circuit which is adapted for switching between operating at two different clock frequencies and which is driven by a single clock source provides the correct clock frequency to the USB, Ethernet, or other interface which is active in the printer or other device at a savings in cost and size over known methods for providing the two different clock frequencies.

DETAILED DESCRIPTION

Figure 1:
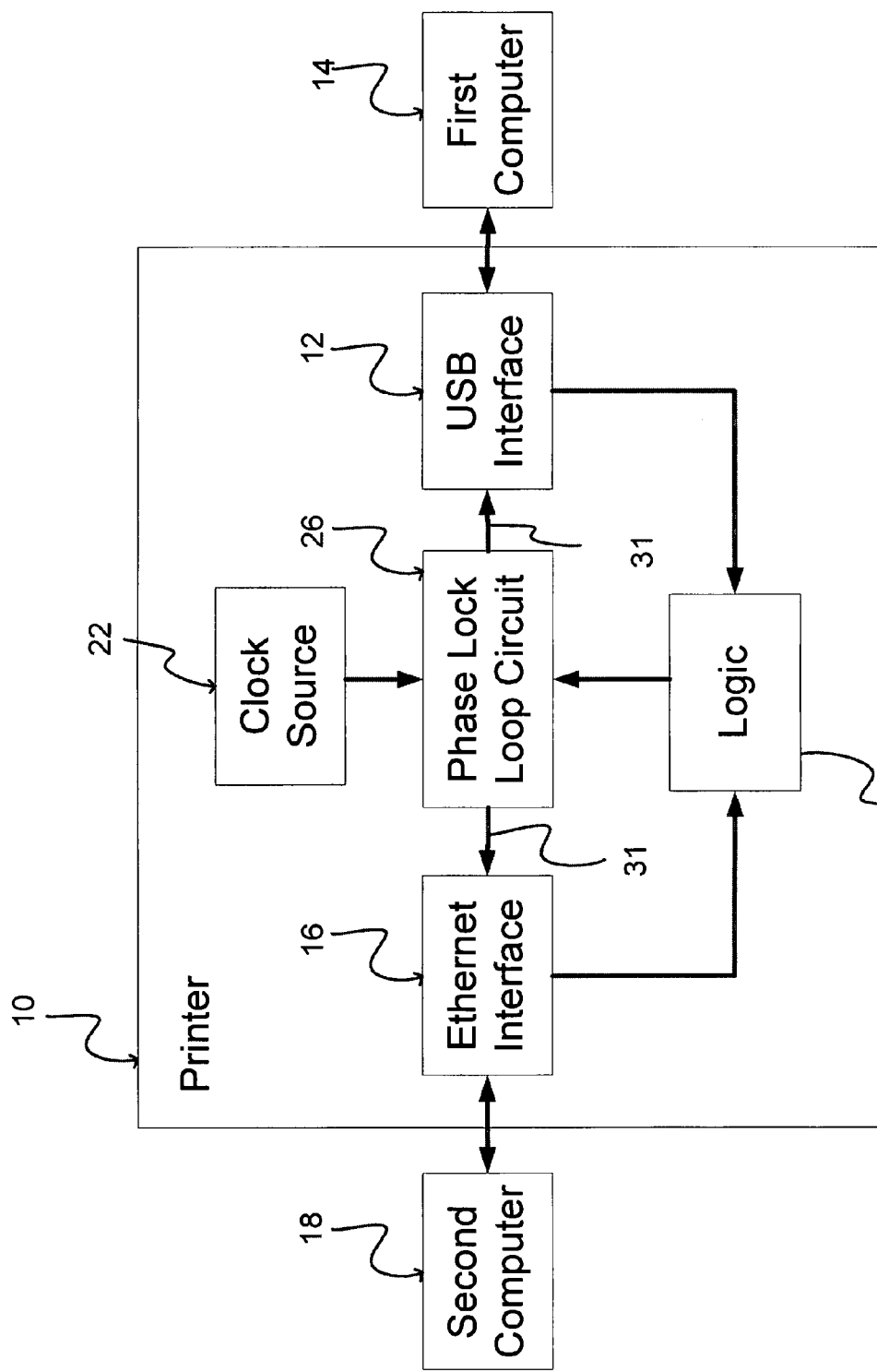
FIG. 1 is a system block diagram of an embodiment of a printer which has a USB interface and an Ethernet interface and which is adapted for using the first method of the invention.
Figure 2:
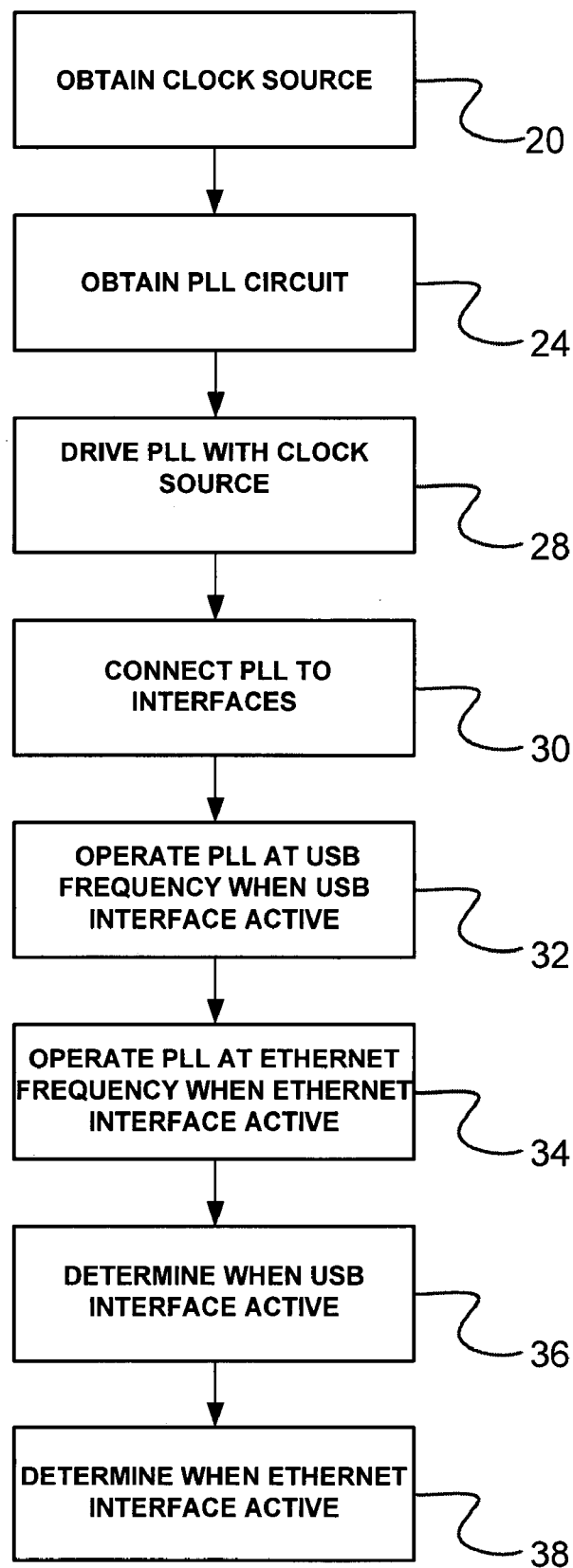
FIG. 2 is flow chart of the first method of the invention.
Figure 3:
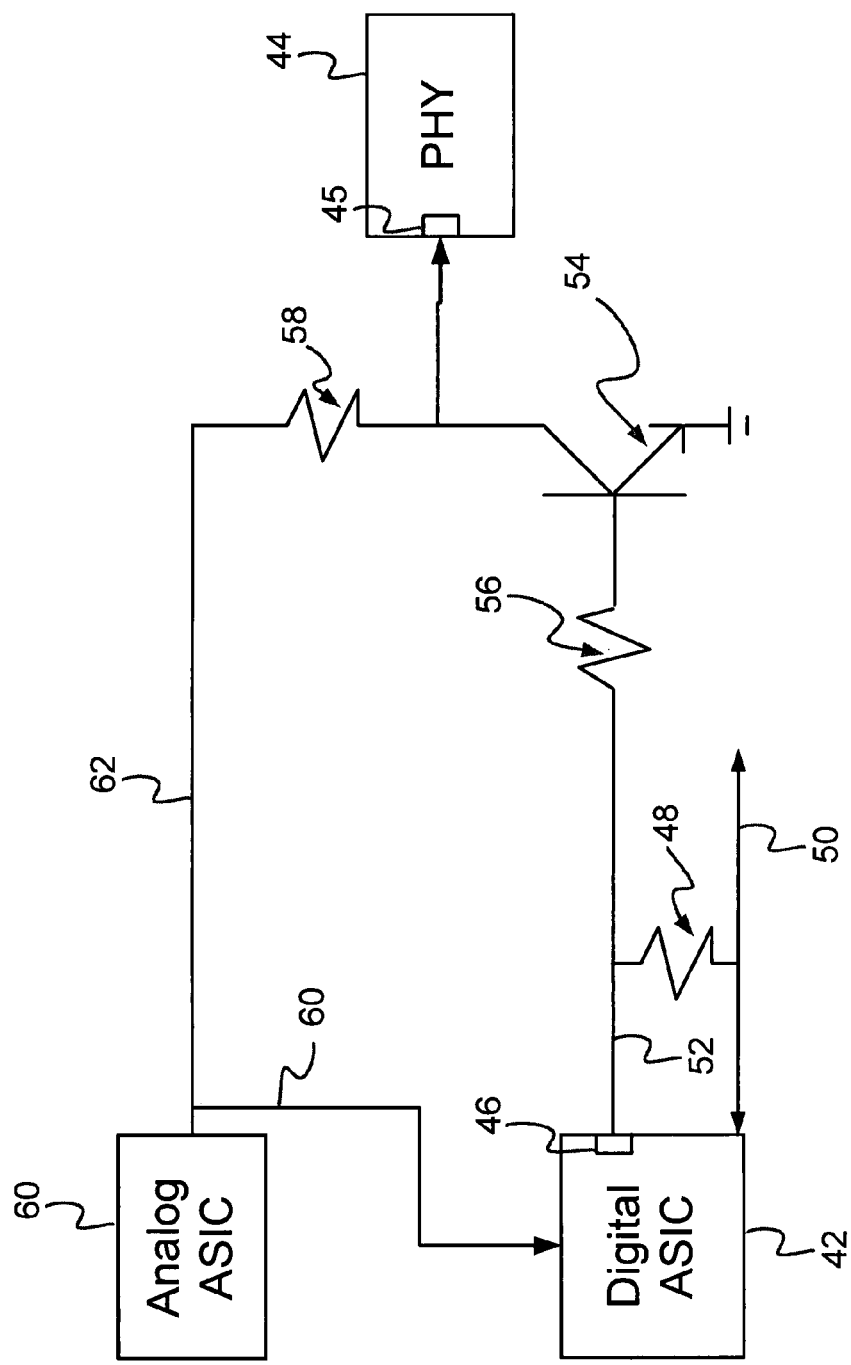
FIG. 3 is a circuit block diagram of an embodiment of a circuit for holding the PHY of the Ethernet interface of the printer of FIG. 1 in reset while the USB interface of the printer in FIG. 1 is active.

Referring to FIGS. 1-3, a first method of the invention is for operating a printer 10 having a Universal Serial Bus (USB) interface 12 connectable to a first computer 14 and having an Ethernet interface 16 connectable to a second computer 18. The USB interface 12 operates at a USB clock frequency, and the Ethernet interface 16 operates at a different Ethernet clock frequency. The printer 10 communicates over only one of the USB and Ethernet interfaces 12 and 16 at the same time. The first method includes steps a) through h).

Step a) of the first method is labeled as "Obtain Clock Source" in block 20 of FIG. 2. Step a) includes obtaining a clock source 22 having a set base frequency. Step b) is labeled as "Obtain PLL Circuit" in block 24 of FIG. 2. Step b) includes obtaining a phase lock loop circuit 26 adapted for switching between operating at the USB and Ethernet clock frequencies when driven by the clock source 22. It is noted that adapting a clock-source-driven phase lock loop circuit to operate at different clock frequencies is within the level of skill of the artisan. Step c) is labeled as "Drive PLL With Clock Source" in block 28 of FIG. 2. Step c) includes driving the phase lock loop circuit 26 with the clock source 22.

Step d) is labeled as "Connect PLL To Interfaces" in block 30 of FIG. 2. Step d) includes operatively connecting the phase lock loop circuit 26 to the USB and Ethernet interfaces 12 and 16 to provide a clock signal 31 to the USB and Ethernet interfaces 12 and 16. Step e) is labeled as "Operate PLL at USB Frequency When USB Interface Active" in block 32 of FIG. 2. Step e) includes operating the phase lock loop circuit 26 at the USB clock frequency when the USB interface 12 is active. Step f) is labeled as "Operate PLL at Ethernet Frequency When Ethernet Interface Active" in block 34 of FIG. 2. Step f) includes operating the phase lock loop circuit 26 at the Ethernet clock frequency when the Ethernet interface 16 is active.

Step g) is labeled as "Determine When USB Interface Active" in block 36 of FIG. 2. Step g) includes determining that the USB interface 12 is active when power (VBUS) supplied over the USB interface 12 by the first computer 14 to the printer 10 is present and when a link between the second computer 18 and the printer 10 is not established on the Ethernet interface physical layer (PHY) that controls the signaling rate on the network. Step h) is labeled as "Determine When Ethernet Interface Active" in block 38 of FIG. 2. Step h) includes determining that the Ethernet interface 16 is active when a link is established between the second computer 18 and the printer 10 on the Ethernet interface PHY before VBUS is present.

In one implementation of the first method, there is also included the step of operatively disconnecting the Ethernet interface 16 from the phase lock loop circuit 26 when the USB interface 12 is active. This will prevent any possible problems of having the USB clock frequency get on the Ethernet interface 16 and out on the network should the network Ethernet cable be plugged into the Ethernet interface 16 and the USB interface 12 be active. In one modification, the Ethernet interface 16 is operatively disconnected from the phase lock loop circuit 26 by holding the Ethernet interface PHY in reset.

In one design of the printer 10, a logic block 40 (shown in FIG. 1) is used to perform steps e) through h). In one variation, the clock source 22 (such as a crystal or resonator), the phase lock loop circuit 26, the logic block 40, the logic of the USB interface 12, and the logic of the Ethernet interface 16 reside in a digital application specific integrated circuit (ASIC) 42 (shown in FIG. 3). In this variation, and referring to FIGS. 1 and 3, the Ethernet interface PHY 44 has a logic-low reset pin 45, the USB interface 12 includes a pull-up pin 46 which controls a pull-up resistor 48 (e.g., 1.5K ohm) on the D+ (for a full-speed device) or D− (for a low-speed device) data line 50 on the USB interface 12, the USB interface 12 drives the pull-up pin 46 high if VBUS is present and drives the pull-up pin 46 low if VBUS is not present, and the pull-up pin 46 is connected by line 52 (e.g., through an inverting transistor 54) to the reset pin 45 for the reset pin 45 to hold the Ethernet interface PHY 44 in reset when the USB interface 12 is active. The circuit in FIG. 3 also includes two additional resistors 56 and 58 (e.g., 10K ohm) with the printer analog ASIC 60 adapted for sending a system reset signal over lines 60 and 62 to the digital ASIC 42 and to the Ethernet interface PHY 44 as shown. The circuit in FIG. 3 eliminates adding a costly pin to the digital ASIC 42 to be used to hold the Ethernet interface PHY in reset since that circuit makes use of the existing pull-up pin 46 which is gated by control logic internal to the digital ASIC 42 based on the signal from the VBUS input pin (not shown) coming from the USB interface. It is noted that it is possible the USB interface will have the wrong clock frequency when the Ethernet interface is active, but in this situation, the USB interface will not be active because of control of the pull-up resistor on the D+ or D− data line, as can be appreciated by the artisan.

In a first utilization of the first method, and referring to FIGS. 1 and 3, at power-up the phase lock loop (PLL) circuit 26 operates at the USB clock frequency which is the set base frequency 48 MHz of the clock source 22. The clock signal going to the Ethernet interface PHY 44 (coming from a pin, not shown, on the digital ASIC 42) is gated off. A first check looks for VBUS on the USB interface 12.

In this utilization, if VBUS is present after power up, then the USB port will be active. The pull-up resistor 48 on the D+ or D− data line 50 on the USB interface 12 is pulled up to 3.3 volts by the pull-up pin 46 to signal to the first computer 14 that the printer 10 is attached to the USB interface 12 and is ready. The Ethernet interface PHY 44 will be held in reset (by the logic-high signal on line 52 being inverted by the inverting transistor 54 to become a logic-low reset signal on reset pin 45) while the USB interface 12 is active, so if an Ethernet cable is plugged into the printer 10, the printer 10 will not try to communicate with the network. The USB interface 12 will remain active as long as VBUS is present on the USB interface 12.

In this utilization, if VBUS is removed while the USB interface 12 is active or if VBUS is not present at power-up, then the Ethernet interface PHY 44 is brought out of reset (by the logic-low signal on line 52 being inverted by the inverting transistor 54 to become a logic-high no-reset signal on reset pin 45). The clock frequency of the PLL circuit 26 is switched from the USB clock frequency of 48 MHz to 50 MHz and divided by two to have the PLL circuit 26 operate at the Ethernet clock frequency of 25 MHz. Once the Ethernet clock frequency is locked by the PLL circuit 26, the clock signal to the Ethernet interface PHY 44 is turned on. At this time, the USB and Ethernet interfaces 12 and 16 are "monitored" for activity. The USB interface 12 is monitored by watching the VBUS signal. If VBUS becomes present, then the clock signal to the Ethernet interface PHY 44 will be gated off. The clock frequency of the PLL circuit 26 will then be switched from 50 MHz to 48 MHz. The method then goes back to the state where it raises the pull-up pin 46 to signal that a first computer 14 has become attached to USB interface 12 of the printer 10. But, if VBUS is not present and a "link" is established by the Ethernet interface PHY 44 to a network, then the Ethernet interface 16 will be considered active. The Ethernet interface 16 will remain active until the power button (a button putting the printer 10 into a standby mode) is pushed or power is removed from the printer 10. If the power button is again pushed (taking the printer 10 out of the standby mode), the method will then return to the state where it monitors the USB and Ethernet interfaces 12 and 16 for VBUS or "link" to network.

A second method of the invention is for operating a device having a Universal Serial Bus (USB) interface connectable to a first computer and having an Ethernet interface connectable to a second computer, wherein the USB interface operates at a USB clock frequency and the Ethernet interface operates at a different Ethernet clock frequency, and wherein the device communicates over only one of the USB and Ethernet interfaces at the same time. The method includes steps a) through f) which are identical to steps a) through f) of the previously-described first method.

In one enablement of the second method, the device is a printer. In other enablement, the device is a scanner or another computer. Still other devices are left to the artisan and to the inventor.

In one application of the first and/or second method, the USB clock frequency is substantially 48 megahertz (MHz), and the Ethernet clock frequency is substantially 25 MHz. In the same or a different application, the clock source is a crystal or a resonator, and the set base frequency of the clock source is 24 or 48 MHz.

In one example of the second method, there is also included the step of determining that the USB interface is active and/or the step of determining that the Ethernet interface is active as previously described in the first method but with "device" replacing "printer" and with the values of the pull-up and other resistors left to the artisan. It is noted that logic-high reset pins are known for which an inverting transistor would not be used.

A third method of the invention is for operating a device having a first interface connectable to a first computer and having a second interface connectable to a second computer, wherein the first interface operates at a first clock frequency and the second interface operates at a different second clock frequency, and wherein the device communicates over only one of the first and second interfaces at the same time. The third method includes the steps of obtaining a clock source having a set base frequency and obtaining a phase lock loop circuit adapted for switching between operating at the first and second clock frequencies when driven by the clock source. The third method also includes the steps of driving the phase lock loop circuit with the clock source and operatively connecting the phase lock loop circuit to the first and second interfaces to provide a clock signal to the first and second interfaces. The third method additionally includes the steps of operating the phase lock loop circuit at the first clock frequency when the first interface is active and operating the phase lock loop circuit at the second clock frequency when the second interface is active.

In one implementation of the third method, the first and second interfaces of the device provide a wired connection to the first and second computers. In another implementation, the first and second interfaces of the device provide a wireless connection to the first and second computers. In one utilization of the third method, the first interface is a non-network interface, and the second interface is a network interface. In one variation, the first interface is a Universal Serial Bus (USB) interface and the second interface is an Ethernet interface.

In one enablement of the third method, the device is a printer. In other enablement, the device is a scanner or another computer. In an additional enablement, the device is a home or work security system or a home appliance, a work machine, or a vehicle having a first interface to communicate directly with an on-site first computer and having a second interface to communicate over a network with an off-site second computer. Still other devices are left to the artisan and to the inventor. It is noted that the term "computer" includes, without limitation, "computer chip".

An embodiment of the invention is for a device (such as, but not limited to a printer 10 as shown in FIG. 1). The device includes a first interface (such as, but not limited to a USB interface 12) which is connectable to a first computer 14 and which operates at a first clock frequency. The device also includes a second interface (such as, but not limited to an Ethernet interface 16) which is connectable to a second computer 18 and which operates at a different second clock frequency. The device additionally includes a clock source 22 having a set base frequency. The device further includes a phase lock loop circuit 26 which is driven by the clock source 22, which is adapted for switching between operating at the first and second clock frequencies, and which is operatively connected to the first and second interfaces to provide a clock signal to the first and second interfaces.

Several benefits and advantages are derived from one or more of the methods and the embodiment of the invention. Using a single phase lock loop circuit which is adapted for switching between operating at two different clock frequencies and which is driven by a single clock source provides the correct clock frequency to the USB, Ethernet, or other interface which is active in the printer or other device at a savings in cost and size over known methods for providing the two different clock frequencies.

The foregoing description of several methods and an embodiment of the invention has been presented for purposes of illustration. It is not intended to be exhaustive or to limit the invention to the precise procedures and forms disclosed, and obviously many modifications and variations are possible in light of the above teaching. It is intended that the scope of the invention be defined by the claims appended hereto.

What is claimed is:

1. A method for operating a printer having a Universal Serial Bus (USB) interface connectable to a first computer and having an Ethernet interface connectable to a second computer, wherein the USB interface operates at a USB clock frequency and the Ethernet interface operates at a different Ethernet clock frequency, wherein the printer communicates over only one of the USB and Ethernet interfaces at the same time, and wherein the method comprises the steps of:
   a) obtaining a clock source having a set base frequency;
   b) obtaining a phase lock loop circuit adapted for switching between operating at the USB and Ethernet clock frequencies when driven by the clock source;
   c) driving the phase lock loop circuit with the clock source;
   d) operatively connecting the phase lock loop circuit to the USB and Ethernet interfaces to provide a clock signal to the USB and Ethernet interfaces;
   e) operating the phase lock loop circuit at the USB clock frequency when the USB interface is active;
   f) operating the phase lock loop circuit at the Ethernet clock frequency when the Ethernet interface is active;
   g) determining that the USB interface is active when power (VBUS) supplied over the USB interface by the first computer to the printer is present and when a link between the second computer and the printer is not established on the Ethernet interface physical layer (PHY) that controls the signaling rate on the network; and
   h) determining that the Ethernet interface is active when a link is established between the second computer and the printer on the Ethernet interface PHY before VBUS is present.

2. The method of claim 1, including the step of operatively disconnecting the Ethernet interface from the phase lock loop circuit when the USB interface is active.

3. The method of claim 2, wherein the Ethernet interface is operatively disconnected from the phase lock loop circuit by holding the Ethernet interface PHY in reset.

4. The method of claim 3, wherein the Ethernet interface PHY has a logic-low reset pin, wherein the USB interface includes a pull-up pin which controls a pull-up resistor on a data line on the USB interface, wherein the USB interface drives the pull-up pin high if VBUS is present and drives the pull-up pin low if VBUS is not present, and wherein the pull-up pin is connected through an inverting transistor to the reset pin for the reset pin to hold the Ethernet interface PHY in reset when the USB interface is active.

5. A method for operating a device having a Universal Serial Bus (USB) interface connectable to a first computer and having an Ethernet interface connectable to a second computer, wherein the USB interface operates at a USB clock frequency and the Ethernet interface operates at a different Ethernet clock frequency, wherein the device communicates over only one of the USB and Ethernet interfaces at the same time, and wherein the method comprises the steps of:
   a) obtaining a clock source having a set base frequency;
   b) obtaining a phase lock loop circuit adapted for switching between operating at the USB and Ethernet clock frequencies when driven by the clock source;
   c) driving the phase lock loop circuit with the clock source;
   d) operatively connecting the phase lock loop circuit to the USB and Ethernet interfaces to provide a clock signal to the USB and Ethernet interfaces;
   e) operating the phase lock loop circuit at the USB clock frequency when the USB interface is active;
   f) operating the phase lock loop circuit at the Ethernet clock frequency when the Ethernet interface is active;
   g) having the device communicate with the first computer when the phase lock loop circuit is operating at the USB clock frequency; and
   h) having the device communicate with the second computer when the phase lock loop circuit is operating at the Ethernet clock frequency.

6. The method of claim 5, wherein the device is a printer.

7. The method of claim 5, wherein the USB clock frequency is substantially 48 megahertz (MHz) and the Ethernet clock frequency is substantially 25 MHz.

8. The method of claim 7, wherein the clock source is one of a crystal and a resonator, and wherein the set base frequency of the clock source is one of 24 and 48 MHz.

9. A method for operating a device having a Universal Serial Bus (USB) interface connectable to a first computer and having an Ethernet interface connectable to a second computer, wherein the USB interface operates at a USB clock frequency and the Ethernet interface operates at a different Ethernet clock frequency, wherein the device communicates over only one of the USB and Ethernet interfaces at the same time, and wherein the method comprises the steps of:
   a) obtaining a clock source having a set base frequency;
   b) obtaining a phase lock loop circuit adapted for switching between operating at the USB and Ethernet clock frequencies when driven by the clock source;
   c) driving the phase lock loop circuit with the clock source;
   d) operatively connecting the phase lock loop circuit to the USB and Ethernet interfaces to provide a clock signal to the USB and Ethernet interfaces; e) operating the phase lock loop circuit at the USB clock frequency when the USB interface is active; and
   f) operating the phase lock loop circuit at the Ethernet clock frequency when the Ethernet interface is active, and also including the step of determining that the USB interface is active when power (VBUS) supplied over the USB interface by the first computer to the device is present and when a link between the second computer and the device is not established on the Ethernet interface physical layer (PHY) that controls the signaling rate on the network.

10. The method of claim 9, also including the step of determining that the Ethernet interface is active when a link is established between the second computer and the device on the Ethernet interface PHY before VBUS is present.

11. A method for operating a device having a Universal Serial Bus (USB) interface connectable to a first computer and having an Ethernet interface connectable to a second computer, wherein the USB interface operates at a USB clock frequency and the Ethernet interface operates at a different Ethernet clock frequency, wherein the device communicates over only one of the USB and Ethernet interfaces at the same time, and wherein the method comprises the steps of:
   a) obtaining a clock source having a set base frequency;
   b) obtaining a phase lock loop circuit adapted for switching between operating at the USB and Ethernet clock frequencies when driven by the clock source;

c) driving the phase lock loop circuit with the clock source;

d) operatively connecting the phase lock loop circuit to the USB and Ethernet interfaces to provide a clock signal to the USB and Ethernet interfaces;

e) operating the phase lock loop circuit at the USB clock frequency when the USB interface is active; and f) operating the phase lock loop circuit at the Ethernet clock frequency when the Ethernet interface is active, and also including the step of determining that the Ethernet interface is active when a link is established between the second computer and the device on the Ethernet interface physical layer (PHY) that controls the signaling rate on the network before power (VBUS) supplied over the USB interface by the first computer to the device is present.

12. The method of claim 5, also including the step of operatively disconnecting the Ethernet interface from the phase lock loop circuit when the USB interface is active.

13. The method of claim 12, wherein the Ethernet interface is operatively disconnected from the phase lock loop circuit by holding the Ethernet interface PHY in reset.

14. A method for operating a device having a Universal Serial Bus (USB) interface connectable to a first computer and having an Ethernet interface connectable to a second computer, wherein the USB interface operates at a USB clock frequency and the Ethernet interface operates at a different Ethernet clock frequency, wherein the device communicates over only one of the USB and Ethernet interfaces at the same time, and wherein the method comprises the steps of:

a) obtaining a clock source having a set base frequency;

b) obtaining a phase lock loop circuit adapted for switching between operating at the USB and Ethernet clock frequencies when driven by the clock source;

c) driving the phase lock loop circuit with the clock source;

d) operatively connecting the phase lock loop circuit to the USB and Ethernet interfaces to provide a clock signal to the USB and Ethernet interfaces;

e) operating the phase lock loop circuit at the USB clock frequency when the USB interface is active; and f) operating the phase lock loop circuit at the Ethernet clock frequency when the Ethernet interface is active, and also including the step of operatively disconnecting the Ethernet interface from the phase lock loop circuit when the USB interface is active, wherein the Ethernet interface is operatively disconnected from the phase lock loop circuit by holding the Ethernet interface PHY in reset, and wherein the Ethernet interface PHY has a logic-low reset pin, wherein the USB interface includes a pull-up pin which controls a pull-up resistor on a data line on the USB interface, wherein the USB interface drives the pull-up pin high if VBUS is present and drives the pull-up pin low if VBUS is not present, and wherein the pull-up pin is connected through an inverting transistor to the reset pin for the reset pin to hold the Ethernet interface PRY in reset when the USB interface is active.

15. A method for operating a device having a first interface connectable to a first computer and having a second interface connectable to a second computer, wherein the first interface operates at a first clock frequency and the second interface operates at a different second clock frequency, wherein the device communicates over only one of the first and second interfaces at the same time, and wherein the method comprises the steps of:

a) obtaining a clock source having a set base frequency;

b) obtaining a phase lock loop circuit adapted for switching between operating at the first and second clock frequencies when driven by the clock source;

c) driving the phase lock loop circuit with the clock source;

d) operatively connecting the phase lock loop circuit to the first and second interfaces to provide a clock signal to the first and second interfaces;

e) operating the phase lock loop circuit at the first clock frequency when the first interface is active;

f) operating the phase lock loop circuit at the second clock frequency when the second interface is active;

g) having the device communicate with the first computer when the phase lock loop circuit is operating at the first clock frequency; and h) having the device communicate with the second computer when the phase lock loop circuit is operating at the second clock frequency.

16. The method of claim 15, wherein the device is a printer.

17. The method of claim 15, wherein the first interface is a non-network interface and the second interface is a network interface.

18. The method of claim 17, wherein the first interface is a Universal Serial Bus (USB) interface and the second interface is an Ethernet interface.

19. The method of claim 18, wherein the device is a printer.

* * * * *